US011182319B1

(12) United States Patent
Huang et al.

(10) Patent No.: US 11,182,319 B1
(45) Date of Patent: Nov. 23, 2021

(54) CAMERA SYSTEM WITH PWM-ACTIVATED, BURST-SELF-REFRESH, DRAM TO REDUCE STANDBY POWER CONSUMPTION

(71) Applicant: OmniVision Technologies, Inc., Santa Clara, CA (US)

(72) Inventors: Wei-Feng Huang, Saratoga, CA (US); Yuguo Ye, Santa Clara, CA (US); Chin Tong Thia, Singapore (SG); Biao He, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/069,752

(22) Filed: Oct. 13, 2020

(51) Int. Cl.
| | |
|---|---|
| *G06F 13/28* | (2006.01) |
| *G06F 13/16* | (2006.01) |
| *G06F 9/38* | (2018.01) |
| *G06K 9/66* | (2006.01) |
| *G06K 9/00* | (2006.01) |

(52) U.S. Cl.
CPC ............ *G06F 13/28* (2013.01); *G06F 9/3877* (2013.01); *G06F 13/1673* (2013.01); *G06K 9/00718* (2013.01); *G06K 9/66* (2013.01)

(58) Field of Classification Search
None
See application file for complete search history.

(56) References Cited

U.S. PATENT DOCUMENTS

| | | | | |
|---|---|---|---|---|
| 9,838,641 | B1* | 12/2017 | Lim | H04N 5/23241 |
| 2016/0180917 | A1* | 6/2016 | Chishti | G11C 11/4096 |
| | | | | 365/203 |
| 2018/0173571 | A1* | 6/2018 | Huang | G06N 3/063 |
| 2018/0196587 | A1* | 7/2018 | Bialynicka-Birula | |
| | | | | G06T 3/0093 |
| 2018/0367752 | A1* | 12/2018 | Donsbach | H04N 19/136 |

\* cited by examiner

*Primary Examiner* — Michael Sun
(74) *Attorney, Agent, or Firm* — Lathrop GPM LLP

(57) ABSTRACT

A low-power image capture device includes a first image buffer in SRAM coupled to receive images from an image sensor, and a second image buffer receiving images transferred in bursts from the first image buffer, the second image buffer implemented in PASR DRAM, the image buffers together operating as a first-in, first-out, (FIFO) buffer. The device includes an activation detector. The PASR DRAM is powered while receiving bursts of images from the first image buffer, and when the image capture device is in the activated mode; and in ultra-low power PASR mode otherwise. A method includes capturing images into the first image buffer, transferring the images in bursts into a second image buffer in PASR DRAM powered while receiving the images in bursts, the PASR DRAM otherwise in ultra-low power PASR mode; and, upon activating, an image processor receiving images from the second image buffer.

8 Claims, 4 Drawing Sheets

CAMERA SYSTEM WITH PWM-ACTIVATED, BURST-SELF-REFRESH, DRAM TO REDUCE STANDBY POWER CONSUMPTION

BACKGROUND

Shutter lag—the time from a triggering event to capturing photographs or beginning a video recording—is, in many cameras, long enough to prevent capture of interesting events. With security cameras particularly, it can also be desirable to capture a preview, sometimes known as pre-rolled video, including at least some video of events occurring a second or more before a triggering event, not just video of events following the triggering event. A solution is to operate at least part of the camera system continually, capturing video in a low-power circular buffer, and waking up a remainder of the camera system to perform additional processing and storage functions when triggering events occur.

Continual operation of at least part of a camera system may also be used to detect triggering events such as by detecting moving objects that may appear in video. For example, security cameras may record high resolution video after detecting motion in low resolution video.

Other applications where it may be desirable to operate at least part of a camera system continually include some facial recognition and fingerprint recognition systems as well as police bodycams.

Camera systems operating continually consume power. Green energy conservation requires always-on systems use little power on average, requiring low-power consumption between activations. The available power for continually operating hardware is often strictly limited in battery-operated systems by battery size, weight, and recharge interval considerations.

To keep power consumption low, low-power circular, or first-in, first-out, image buffers have been implemented in static random-access memory (SRAM), where the image buffer holds preview frames until an activation event occurs and a processor is awakened to compress or otherwise process them. SRAM is, however, expensive; such systems often limit preview memory to a few seconds of storage at low frame rates.

Certain JEDEC-standard dynamic random-access memory (DRAM) memory devices, including LPDDR3 memories, intended for mobile, low-power, computing applications from companies including Elpida Memory of Japan, Winbond Electronics Corporation of Taiwan, Micron Technologies, and others, have a self-refresh mode that provides an internal refresh counter for timing and generating refresh addresses, and circuitry that permits refresh operation using these internally generated refresh addresses while ignoring external address inputs. Many of these self-refreshing DRAM devices have a partial-array self-refresh (PASR) mode. The PASR mode permits refresh using internally generated addresses of only one or two banks instead of all banks of the DRAM device. Refreshing only one or two banks of a PASR DRAM typically consumes less power than required to refresh an entire DRAM device.

SUMMARY

A low-power image capture device includes an image sensor; a first image buffer coupled to receive images from the image sensor, the first image buffer implemented in static random access memory (SRAM); and a second image buffer coupled to receive images transferred in bursts from the first image buffer, the second image buffer implemented in a partial-array self-refresh (PASR) dynamic random access memory (DRAM), the first image buffer together with the second image buffer together operating as a first-in, first-out, (FIFO) image frame buffer. The device also includes an activation detector coupled to cause the image capture device to enter an activated mode. The PASR DRAM is configured to be powered while receiving bursts of images from the first image buffer, and when the image capture device is in the activated mode and to be in ultra-low power PASR mode otherwise.

A method of capturing sequences of images includes in a low-power mode where an image processor is inactive, capturing images into a first image buffer implemented in static random access memory (SRAM), transferring the images in bursts into a second image buffer implemented in partial-array self-refresh dynamic random access memory (PASR DRAM), the PASR DRAM being powered while receiving the images in bursts and in ultra-low power PASR mode otherwise; and detecting an activation trigger, the activation trigger triggering a high-power mode. In the high-power mode, the PASR DRAM is powered and an image processor being active, the image processor receiving images from the second image buffer.

DETAILED DESCRIPTION OF THE EMBODIMENTS

Figure 1:
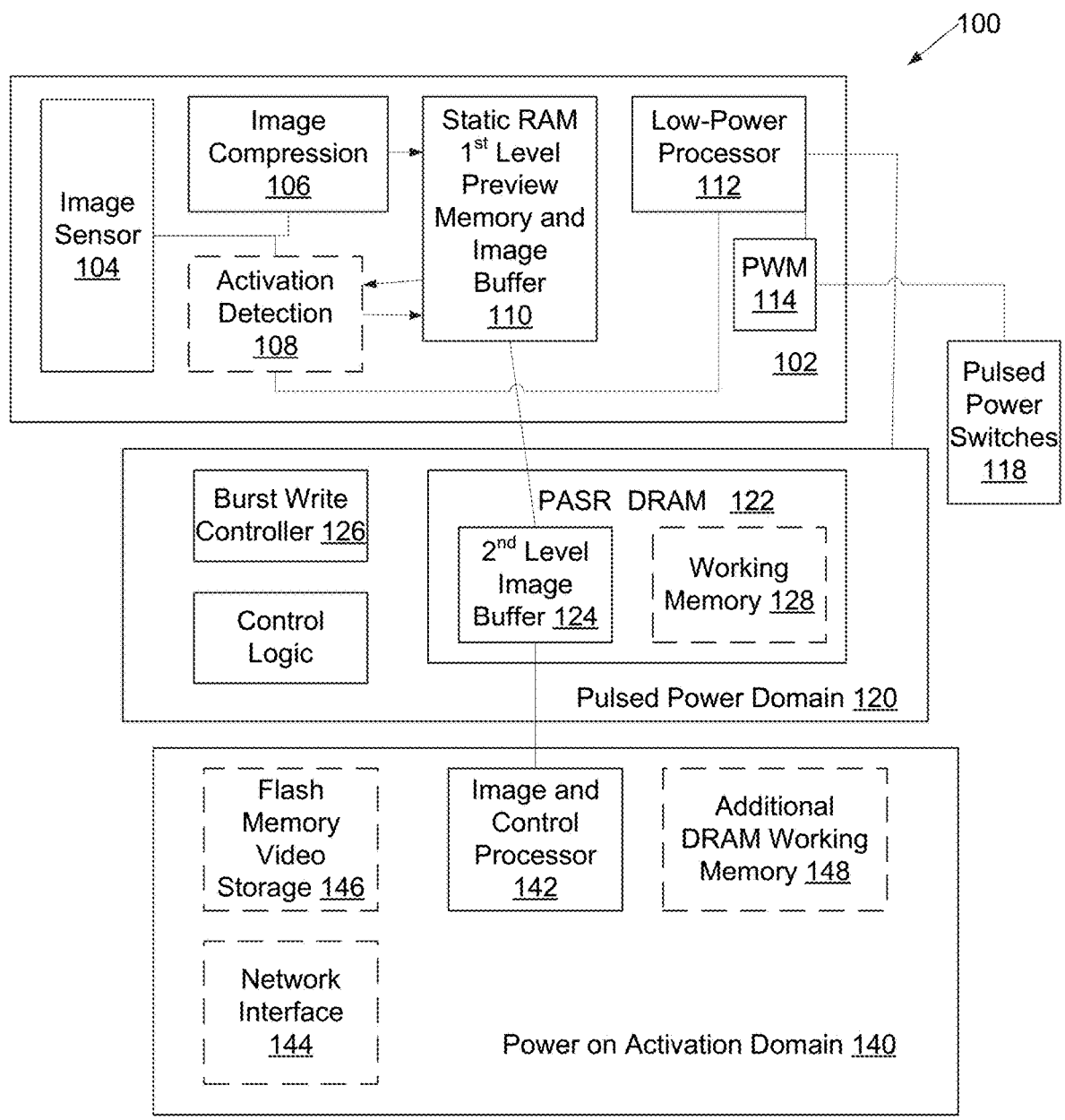
FIG. 1 is a block diagram of an embodiment of a low-power image sensing and processing system.

In a low-power image sensing and processing system 100, a low-power domain 102 includes image sensor 104. Image sensor 104 passes images through image compression 106 logic into a static random-access memory (SRAM) 110 operating as a first-in, first-out, image buffer. In embodiments using images from image sensor 104 for motion detection activation, image sensor 104 also passes images to activation detection 108, which in an embodiment is a motion detection logic, activation detection logic 108 may also receive prior images from the image buffer in SRAM 110 so it can compare these prior images with newly detected images from image sensor 104. In embodiments activated by other sensors, such as infrared motion detectors, activation detection 108 logic may be omitted. In face, fingerprint, or handprint recognition systems, activation detection logic 108 is a coarse recognition unit that detects presence of faces, fingers, or hands without recognizing details applicable to specific people. Low-power domain 102 also incorporates a low-power processor 112. In embodiments, low-power domain 102 includes pulse-width modulator 114 operating under control of low-power processor 112 and coupled to turn on pulsed power domain 120's power switches 118.

Low-power domain 102 is coupled to pass images into a pulsed-power domain 120, where they are stored in a second level image buffer 124 in a Partial-Array Self Refresh (PASR) dynamic RAM (DRAM) 122 under control of burst write controller 126.

Upon detection of events of interest, such as motion detected by a motion detector of activation detection logic 108 or presence of a rough outline of a face detected by a face detector of activation detection logic 108, processor 112 of low-power domain 102 may awaken a sleeping image and control processor 142 of a full power domain 140. Full power domain 140 is left sleeping a vast majority of time while low-power domain 102 and pulsed-power domain 120 are operating, full power domain 140 operates when necessary.

In an embodiment, full power domain 140 includes a network interface 144.

In a security camera implementation of this embodiment, upon activation, image and control processor 142 turns pulsed-power domain 120 fully "on," begin to read full resolution video from image sensor 104 into its working memory, reads preview video from the first level image buffer 110 and second level image buffer 124, and compresses and formats this video into a security recording. Image and control processor 142 then uses network interface 144 to transmit this video to a server. In a particular embodiment, full power domain 140 includes flash video storage 146, which may include a full or micro-sized "SD" memory card. In an alternative embodiment, network interface 144 is omitted and security recordings are recorded on flash video storage 146.

In a face recognition embodiment of this embodiment, upon activation of image and control processor 142 by activation detection logic 108, image and control processor 142 reads full resolution images from image sensor 104 and processes these images to extract facial features from the images. In one particular embodiment, image and control processor 142 compares those facial features to entries of a database of facial features. In another embodiment, image and control processor 142 uses network interface 144 to transmit the facial features over a network to a host processor.

In an embodiment, a portion of PASR DRAM 122 that is not self-refreshed when image and control processor 142 is inactive is dedicated to serving as part or all of a working storage for the image and control processor. In an alternative embodiment, an additional dynamic RAM 148 is provided to serve as part or all of working storage for the system.

The first level image buffer in SRAM 110 together with the second level image buffer 124 in the PASR DRAM together operate as a first-in, first-out, (FIFO) image frame buffer of image frames having greater capacity than SRAM 110.

A primary advantage of the embodiments described herein over typical pre-existing systems is the ability to record more frames of higher resolution preview or pre-rolled video than pre-existing systems without need to expand expensive SRAM, and possibly with smaller SRAM.

Figure 2:
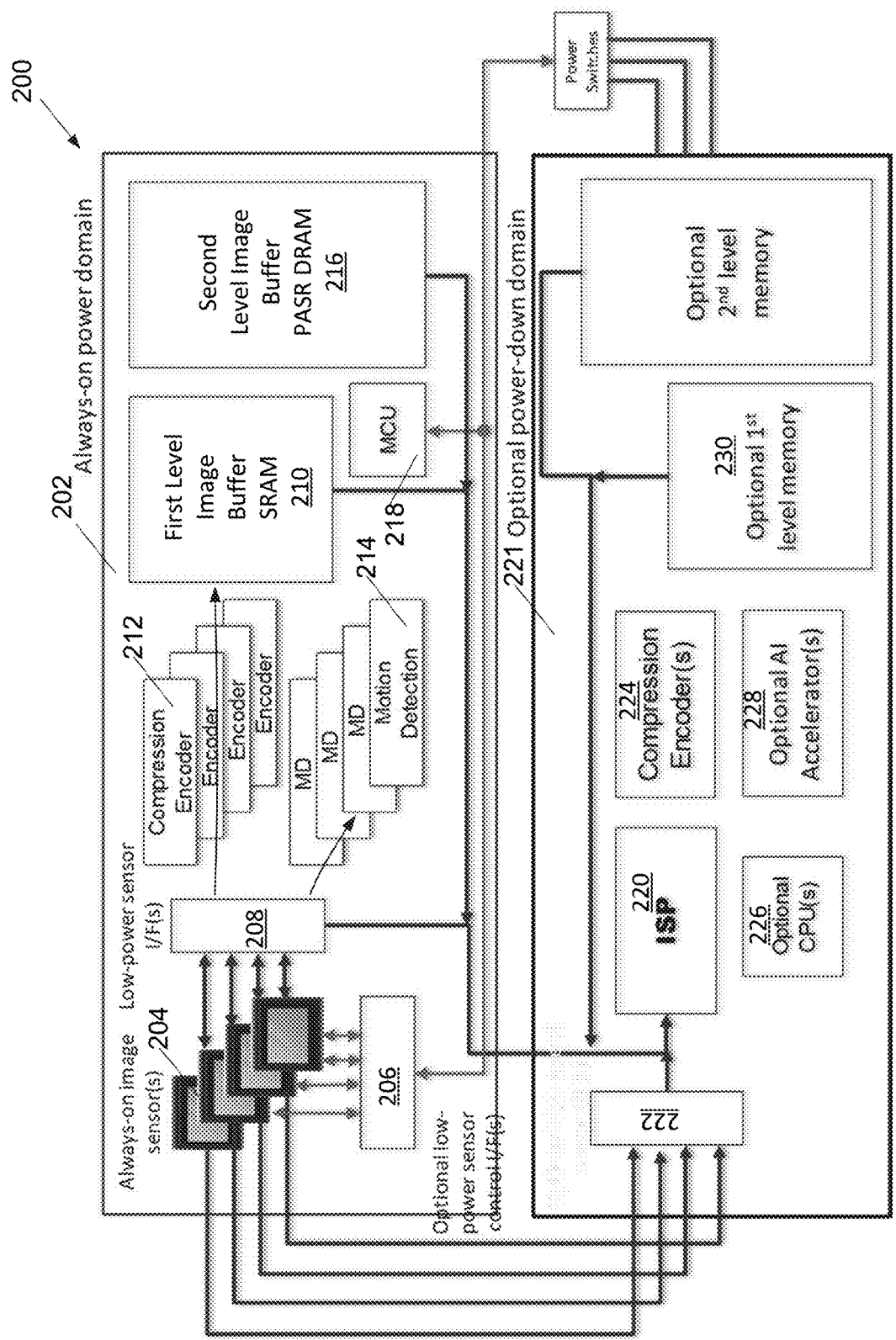
FIG. 2 is a block diagram of another embodiment of a low-power image sensing and processing system.

Another embodiment 200 of the image sensing system is illustrated in FIG. 2. The system includes an always-on power domain 202 including one or more (four are illustrated) image sensors 204 that record images under control of image controller 206. During low-power modes, until full activation of the system, images are read from image sensor 204 through low-power image sensor interfaces 208 into first-level image buffer 210. In particular embodiments, the images from image sensor 204 are compressed by compression encoders 212 before being written to image buffer 210, and are passed to an activation detector. In particular embodiments, the activation detector is a motion detector 214. Images may be copied in bursts from first-level image buffer into second level image buffer 216. Second level image buffer 216 is in a PASR DRAM, as described with reference to PASR DRAM 122 in FIG. 1, and has a pulsed-power so that it has power when the second level image buffer 216 is written and during refresh operations and is otherwise powered down. The low-power mode operates under control of low-power microcontroller 218. When the activation detector recognizes an activation condition, image processor 220 is activated in power-down domain 221. Image processor 220 may read stored images from the first and second level image buffers 210, 216 or directly from the image sensors 204 through high-speed image interfaces 222 and performs additional image processing on the images as necessary for the system; image processor may use any provided additional optional compression encoders 224, CPUs 226, accelerators 228, and memories 230 as necessary to perform functions of the system.

Figure 3:
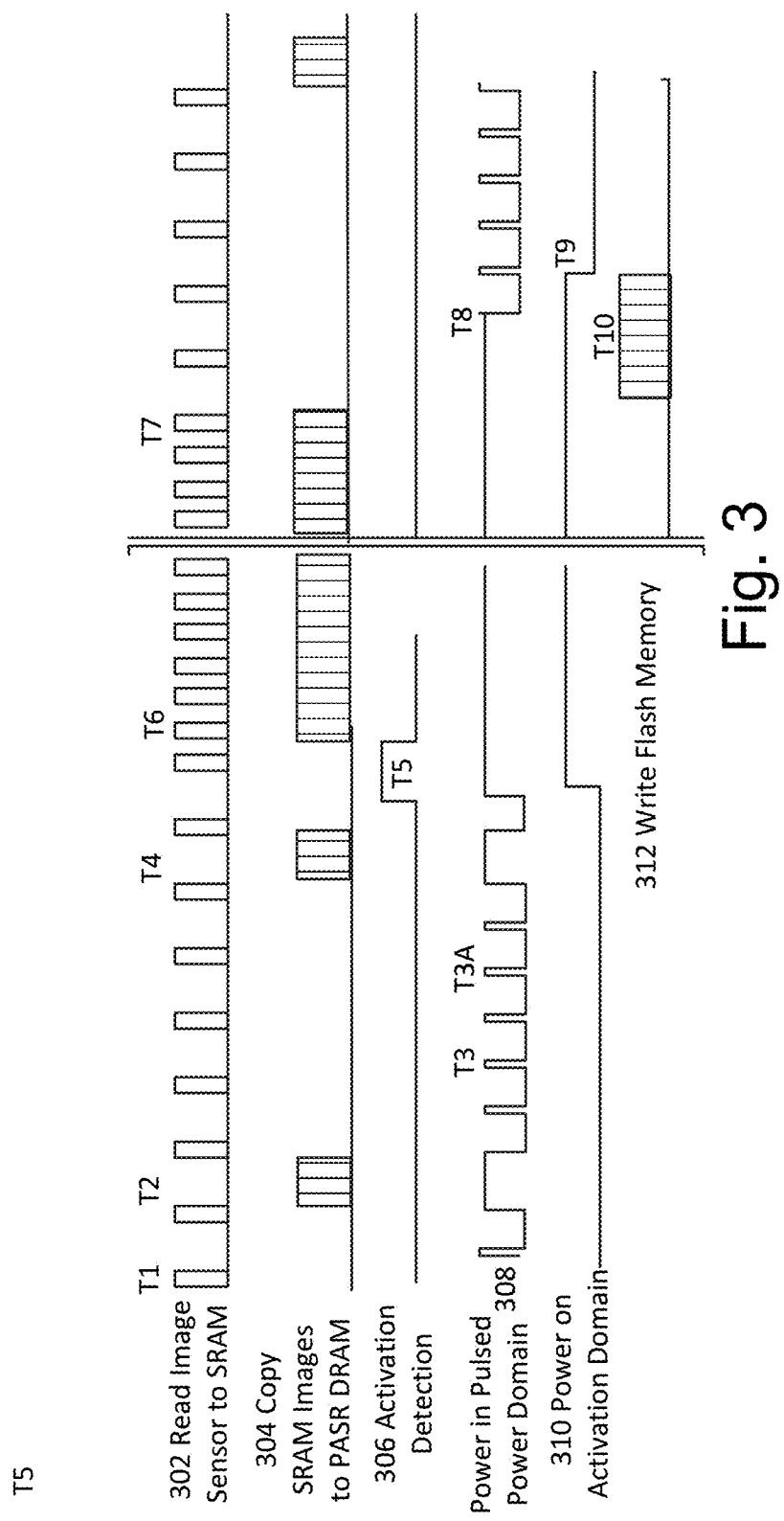
FIG. 3 is a timing diagram illustrating timing of transfer of images from image sensor to SRAM with burst-transfer of images from SRAM to PASR DRAM until an activation signal is detected, and full operation upon activation.

Upon operating the system of FIG. 1, images are periodically, in an embodiment five times per second, read 302, T1, T2 (FIG. 3) from image sensor 104 (FIG. 1) and written to the first level image buffer 110 in SRAM. Since this SRAM is of finite capacity, it will fill up; so periodically T2, T4, the pulsed-power domain 120 is powered up and multiple images are copied in a burst from first level image buffer 110 in SRAM to second level image buffer 124 in PASR DRAM 122 under controller of burst write controller 126. Since the storage nodes in PASR DRAM 122 lose charge with time, at least the PASR DRAM conduct self-refresh of a dynamic RAM bank containing second level image buffer 124.

When an activation event is detected at T5 by activation detection unit 108, pulsed-power domain 120 is powered up fully, in an embodiment enabling refresh of the entire DRAM 122 and use of additional portions of DRAM 122, such as working memory 128, as well as the second level image buffer 124 by image and control processor 142. Image and control processor may than cause image capture to occur at a faster frame rate as shown at T6, read and recompress images from second level image buffer 124 into a video meeting a common video standard, and determine how long full rate, full resolution, video should be recorded. Upon ending capture of full rate, full resolution video at T7, the image and control processor 142 may complete video compression and transmit the video over network interface 144 or write the video to flash memory at T10, de-power the pulsed-power domain 120 except for ongoing partial array refresh needed for second level image buffer 124 at T8, and shut itself off at time T9.

In embodiments, video compression may include standard Motion Picture Experts Group (MPEG) compression, compressed data, determining feature maps of faces in images, determining feature maps of fingerprints on handprints in images, or other compression and processing operations.

In a particular embodiment, the burst reading of images from first level image buffer 110 in SRAM to second level image buffer 124 in PASR DRAM occurs when a pulse generated by pulse-width modulator 114 triggers power switches 118 to power up pulsed-power domain 120. In this embodiment, the second-level memory and all related clocks are turned-on only when the PWM output signal is high or activation has been sensed. Otherwise, it is kept in deep-sleep mode of partial-array DRAM self-refresh. The PWM_CYCLE period is set based on the amount of first-level image buffer available to cache images, and the PWM HIGH TIME is set to the minimum required to copy the first-level image buffer into the second-level image buffer 124.

In a particular embodiment with a LPDDR3 DRAM as PASR DRAM 122, PWM_CYCLE is set to 500 us, and PWM HIGH TIME to 15 us for a 3% duty-cycle. 4×720p image sensors capture data at 5 fps, 500 us accumulates ~10 KB of data in the first level image buffer. The accumulated 10 KB of data is transferred to second level image buffer during each PWM HIGH TIME of 15 us, requiring usable bandwidth of 10 KB/15 us=683 MBps achievable with 32-bit LPDDR3 at 333 MHz. Second-level image buffer power consumption is estimated as (2 mW (partial-array self-refresh)×97%)+(150 mW (active)×3%)=6.5 mW, less than the 30 mW required for full power DRAM operation.

In embodiments, there may be more than one image sensor 104, each of which records images at 720p resolution during low-power operation, and may optionally record images at a higher resolution when full power domain 140 is activated. In a particular embodiment, during burst copying from first level image buffer 110 in SRAM into second level image buffer 124, low-power processor 112 may perform image cropping.

In a particular embodiment, activation detection 108 is performed by firmware of low-power processor 112. In another embodiment, activation detection 108 is performed by a dedicated unit.

Figure 4:
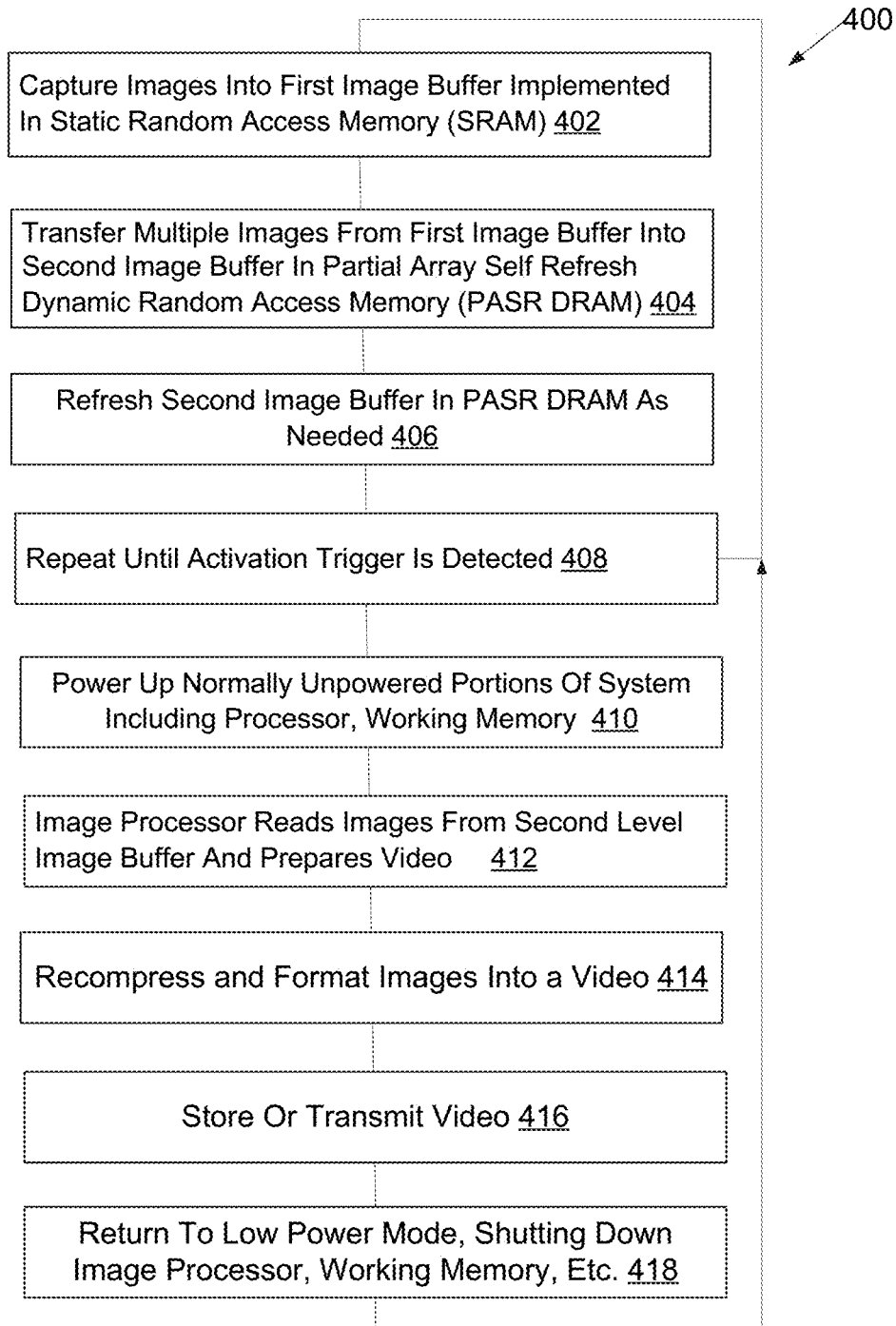
FIG. 4 is a flowchart of a method of capturing a sequence of images and forming a compressed video including pre-activation images.

The low-power image sensor is operated according to the method 400 of FIG. 4, or another similar method. In low-power mode, images are read 402 frame-by-frame from image sensor 104 (FIG. 1) and stored in the first-level image buffer 110, which, in some embodiments, may be compressed by color removal, resolution reduction, or other methods known in the art of digital image processing before being written to first-level image buffer 110. Once multiple images are in first-level image buffer 110, these images are transferred 404 in a burst into a second image buffer 124 implemented in PASR DRAM 122. PASR DRAM 122 being powered while receiving the images in bursts, and PASR DRAM 122 being otherwise in ultra-low power PASR mode. The second-level image buffer in PASR DRAM 122 is periodically refreshed 406 as needed and images beyond a predetermined pre-roll or preview image capacity are deleted as new images are recorded, for example, 10 seconds at five frames per second for each of four image sensors produces 200 images to be kept in the FIFO memory implemented in the two image buffers. The method then waits for an activation trigger to be detected, the activation trigger triggers a high-power mode, whereupon the entire PASR DRAM is powered, and if any portions of PASR DRAM are used as working memory 128, the entire PASR DRAM array is refreshed. In the high-power mode, the image processor 142 is powered and active, the image processor 142 reads images 412 from the second image buffer 124. In embodiments, the image processor also reads images directly from the image sensor 110 and the first image buffer 110, and may operate the sensor and buffer at a higher frame rate, with color, and/or higher resolution than when in low-power mode. The image processor formats and recompresses 414 these images into a video, then records 416 in flash memory or transmits the video to a server; the image processor may also trigger alarms or perform other tasks. Once the video is stored and other high-power activities complete, the system returns 418 to low-power mode by shutting down the image processor, depowering any additional memory, shutting off refresh to PASR DRAM portions not used for second image buffer 124, and otherwise conserving power.

Combinations

The energy-saving concepts herein described may be combined in various ways, including:

A low-power image capture device designated A including an image sensor; a first image buffer coupled to receive images from the image sensor, the first image buffer implemented in static random access memory (SRAM); and a second image buffer coupled to receive images transferred in bursts from the first image buffer, the second image buffer implemented in a partial-array self-refresh (PASR) dynamic random access memory (DRAM), the first image buffer together with the second image buffer together operating as a first-in, first-out, (FIFO) image frame buffer. The device also includes an activation detector coupled to cause the image capture device to enter an activated mode. The PASR DRAM is configured to be powered while receiving bursts of images from the first image buffer, and when the image capture device is in the activated mode and to be in ultra-low power PASR mode otherwise.

A low-power image capture device designated AA including the low-power image capture device designated A wherein the activation detector performs motion detection.

A low-power image capture device designated AA including the low-power image capture device designated A or AA further including an image processor active when the image capture device is in the activated mode, the image processor coupled to receive images from the FIFO image frame buffer.

A low-power image capture device designated AA including the low-power image capture device designated A, AA, or AB further including a pulse-width modulator (PWM), the PWM coupled to provide power to the PASR DRAM and trigger the transfer in bursts from the first image buffer into the second image buffer.

A method of capturing sequences of images designated B includes in a low-power mode where an image processor is inactive, capturing images into a first image buffer implemented in static random access memory (SRAM), transferring the images in bursts into a second image buffer implemented in partial-array self-refresh dynamic random access memory (PASR DRAM), the PASR DRAM being powered while receiving the images in bursts, the PASR DRAM being otherwise in ultra-low power PASR mode; and detecting an activation trigger, the activation trigger triggering a high-power mode. In the high-power mode, the PASR DRAM is powered and an image processor being active, the image processor receiving images from the second image buffer.

A method of capturing sequences of images designated BA including the method designated B wherein a pulse-width modulator is used to control power to the PASR DRAM in low-power mode.

A method of capturing sequences of images designated BB including the method B or BA wherein the image processing includes formatting the images as a video with preroll, the preroll including images from the second image buffer and obtained by the image sensor before the activation trigger, and including images obtained by the image sensor after the activation trigger.

A method of capturing sequences of images designated BB including the method designated BB further comprising recording the video in a flash memory.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A low-power image capture device comprising:
an image sensor;
a first image buffer coupled to receive images from the image sensor, the first image buffer implemented in static random-access memory (SRAM);
a second image buffer coupled to receive images transferred in bursts from the first image buffer, the second image buffer implemented in a partial-array self-refresh (PASR) dynamic random-access memory (DRAM);
the first image buffer together with the second image buffer together operating as a first-in, first-out, (FIFO) image frame buffer;
an activation detector coupled to cause the image capture device to enter an activated mode; and
wherein the PASR DRAM is configured to be powered while receiving bursts of images from the first image buffer, and when the image capture device is in the activated mode; and to be in ultra-low power PASR mode otherwise.

2. The low-power image capture device of claim 1 wherein the activation detector performs motion detection.

3. The low-power image capture device of claim 2 further comprising an image processor active when the image capture device is in the activated mode, the image processor coupled to receive images from the FIFO image frame buffer.

4. The low-power image capture device of claim 2 further comprising a pulse-width modulator (PWM), the PWM coupled to provide power to the PASR DRAM and trigger the transfer in bursts from the first image buffer into the second image buffer.

5. A method of capturing sequences of images comprising:
in a low-power mode where an image processor is inactive,
capturing images into a first image buffer implemented in static random-access memory (SRAM),
transferring the images in bursts into a second image buffer implemented in partial-array self-refresh dynamic random-access memory (PASR DRAM), the PASR DRAM being powered while receiving the images in bursts, the PASR DRAM being otherwise in ultra-low power PASR mode;
detecting an activation trigger, the activation trigger triggering a high-power mode;
in the high-power mode, the PASR DRAM is powered and the image processor is active, the image processor receiving images from the second image buffer to perform image processing thereon.

6. The method of claim 5 wherein a pulse-width modulator (PWM) is used to control power to the PASR DRAM in the low-power mode.

7. The method of claim 5 wherein the image processing includes formatting the images as a video with preroll, the preroll including images from the second image buffer and obtained by the image sensor before the activation trigger, and including images obtained by the image sensor after the activation trigger.

8. The method of claim 7 further comprising recording the video in a flash memory.

* * * * *